United States Patent Office 2,785,074
Patented Mar. 12, 1957

2,785,074

METHOD OF IMPROVING THE ADHESION OF SYNTHETIC SAUSAGE CASINGS TO THE FILLING

Richard Weingand, Walsrode, Germany

No Drawing. Application June 24, 1953,
Serial No. 363,924

Claims priority, application Germany July 4, 1952

4 Claims. (Cl. 99—176)

The invention relates to a method of improving the adhesion of synthetic sausage casings to the filling.

When using synthetic casings, particularly synthetic sausage casings produced from an alginate basis, which serve particularly as substitutes for natural casings made from sheep's intestines, for example for Frankfurter or Vienna sausages, and are likewise edible, it has been found in practice that, when the sausages are boiled and particularly when they are heated in the tin, the casings no longer adhere as firmly to the sausage meat as is desirable and as occurs with natural casings. The main cause is that a synthetic casing produced from a vegetable basis has, as a vegetable product, no affinity to the sausage filling, and from the osmotic point of view probably has a different, viz, a negative electric charge, from that of the filling.

It has now been unexpectedly discovered that a synthetic casing can be caused by electric charge reversal to adhere more satisfactorily to its filling.

Based on the foregoing discovery, the method according to the present invention for increasing the adhesion of synthetic casings, especially synthetic sausage casings produced from alginates, to their fillings, comprises treating the inside of the synthetic casings during or after manufacture with cation-active substances. By this means it is possible to change the walls of the synthetic casing in a simple manner so that the latter, exactly like the natural casing, unites firmly with the contents and no longer becomes detached therefrom even when heated for long periods and even at temperatures of 120° C. Moreover, when peeled off, the casing retains a thin layer of filling adherent thereto as occurs in a natural casing.

Substances which contain tri- or quadrivalent cations are especially suitable for the purposes of the present invention for the change of the charge of synthetic casings. The appertaining anion should as far as possible have only a very weakly acid character. Compounds having trivalent and quadrivalent cations, in which as for example in aluminum hydroxide, so many OH ions are replaced by chlorine that the compound passes over into the sol condition, are particularly favorable treatment media. When quadrivalent cations are used, compounds with strong acids, for example zirconium nitrate, can also be used. Hydroxides in which a part of the hydroxide ions are replaced by chloride are however also very suitable for the purposes of the present invention.

It has further been found that the described improvement of the adhesion of synthetic casings to their fillings can even be achieved with a very dilute solution of cation-active substances and in addition also during a very short treatment period. The concentrations to be applied in practice are below 2% and in general about 1% for the solutions. However, even solutions of 0.1% strength have also been found sufficiently effective. The treatment can be carried out at normal or at elevated temperature, and a duration of treatment of a few seconds is sufficient. The casing is advantageously merely briefly rinsed internally with the solution.

The cation-active internal treatment medium can be added to the internal precipitation bath to be introduced into the synthetic casing during production of the latter. If the casing is treated after production with a cation-active substance, it is advisable to add this substance to the customary softening or glycerine bath. In the internal treatment of the casing after its production, the concentration of the treatment liquid continuously declines and the liquid must be replaced from time to time. In order to avoid this necessity the casing can be treated from the outside, and after completion of manufacture can be subdivided into, for example, pieces from 5 to 10 metres in length, as is in any case necessary for its use, whereupon the casing is turned inside out. In this way complete uniformity of the adhesion of the inner surface of the synthetic casing is also ensured at the same time.

The invention will be illustrated by the following examples:

*Example 1*

A synthetic casing produced from sodium alginate, converted by precipitation with calcium chloride into insoluble calcium alginate, is treated after precipitation and washing at 20° C., with an aqueous softening bath which, in addition to 10% of glycerine, contains 1% of aluminum oxychloride.

*Example 2*

A sodium alginate solution issuing from an annular nozzle is treated internally and externally with a precipitation bath consisting of a 15% solution of calcium chloride. 1% of zirconium nitrate is added to the precipitation bath applied to the interior of the resulting tube, and the synthetic casing is as usual further treated by washing and softening.

*Example 3*

A seamless synthetic casing, which is produced in the usual manner from a starting material customarily used for the production of synthetic sausage casings, is drawn through a solution containing 10% of glycerine and 1% of zirconium oxychloride, so that the time of treatment amounts to about 1 minute. The excess liquid adhering thereto is removed by a rubber stripper. The synthetic casing is thereupon divided into lengths of 5 metres and turned inside out.

The synthetic casings produced in accordance with the foregoing examples have the desired good and permanent adhesion to the sausage filling even when boiled or when the sausages are heated in the tin.

Having thus described and ascertained the nature of my invention, I declare that what I claim is:

1. A method of improving the adhesion to its content of a synthetic sausage casing made from alginates by precipitation, which comprises reversing the electric charge of the inside of said casing by bringing said inside in contact with a dilute solution of a cation active chemical compound containing multi-valent cations selected from the group consisting of aluminum and zirconium.

2. The method of claim 1 wherein the contact is made by drawing said casing through said solution, then turning the casing inside out.

3. The method of claim 1 wherein the concentration of said compound in said dilute solution ranges from 0.1%–2%.

4. A method of improving the adhesion to its content of a synthetic sausage casing made from alginates by precipitation, which comprises reversing the electric charge of the inside of said casing by bringing said inside in contact with 0.1–2% solution of aluminum oxychloride.

References Cited in the file of this patent
UNITED STATES PATENTS

| | | |
|---|---|---|
| 1,348,459 | Swett | Aug. 3, 1920 |
| 2,485,512 | Rose | Oct. 18, 1949 |
| 2,627,466 | Lewis | Feb. 3, 1953 |